United States Patent
Bauer et al.

(10) Patent No.: US 6,283,547 B1
(45) Date of Patent: Sep. 4, 2001

(54) BACK REST OF A MOTOR VEHICLE SEAT, WHICH HAS AN ADJUSTABLE SHOULDER REST

(76) Inventors: Heinz Bauer, Hammerstr. 9, D-42699, Solinger; Burckhard Becker, Obenkatternberg 25, D-42655, Solinger; Ernst-Reiner Frohnhaus, Hammerstr. 13, D-42699, Solinger, all of (DE)

( * ) Notice: Subject to any disclaimer, the term of this patent is extended or adjusted under 35 U.S.C. 154(b) by 0 days.

(21) Appl. No.: 09/145,434

(22) Filed: Sep. 2, 1998

(30) Foreign Application Priority Data

Sep. 15, 1997 (DE) .............................................. 197 40 588

(51) Int. Cl.[7] ...................................................... A47C 3/025
(52) U.S. Cl. ............................................................ 297/284.1
(58) Field of Search ........................... 297/284.1, DIG. 3, 297/408, 354.12, 284.6, 216.1, 216.13, 452.41, 344.1, 325, 329

(56) References Cited

U.S. PATENT DOCUMENTS

| | | |
|---|---|---|
| 4,626,028 | * 12/1986 | Hatsutta et al. . |
| 5,058,953 | * 10/1991 | Takagi et al. . |
| 5,082,326 | * 1/1992 | Sekido et al. . |
| 5,370,443 | * 12/1994 | Maruyama . |
| 5,826,937 | * 10/1998 | Massara . |
| 5,836,651 | * 11/1998 | Szerdahelyi et al. . |

* cited by examiner

Primary Examiner—Milton Nelson, Jr.
(74) Attorney, Agent, or Firm—John Lezdey & Assoc

(57) ABSTRACT

There is provided a back rest of a motor vehicle seat, which comprises a back rest support (26), onto which a shoulder rest (36) for a separate adjustment of an upper section of the back rest is provided, whereby the shoulder rest (36) is linked to the back rest support (26) and that an adjustment device is allocated to it, which is embodied as an air bag (46), which can be filled and emptied in a controlled manner and which is arranged between the back rest support (26) and the shoulder rest (36) and that re-adjusting device are provided, which are arranged between the shoulder rest (36) and the back rest support (26) and which stress the shoulder rest (36) in one of its two extreme positions, for example the position of the smallest distance from the back rest support (26).

11 Claims, 1 Drawing Sheet

BACK REST OF A MOTOR VEHICLE SEAT, WHICH HAS AN ADJUSTABLE SHOULDER REST

FIELD OF THE INVENTION

The invention relates to a back rest of a motor vehicle seat. The back rest has a back rest support, which provides the mechanical stability and which is linked in the usual way to the seat support or directly at the underframe of the motor vehicle seat. Furthermore, it has an upholstery body. The already known back rest is embodied in a foldable manner for a better adjustment of the back rest to the back of a user and according to the wishes of the person. An upper section can be adjusted within a certain angle to a lower section.

The invention aims to a further development of such a back rest. It is the aim to have a back rest, with which the separate adjustment of the upper section of the back rest has as little relevance as possible with regard to the safety, namely can be embodied in a mechanical manner, because other sections will take over the safety function. This fact enables an embodiment of light weight of the additional adjustment device for the area of the upper back rest.

SUMMARY OF THE INVENTION

According to this, it is the task of the invention to further develop the already known back rest of a motor vehicle seat in such a way that the components, which are necessary for the adjustment device are simple, of light weight and of little relevance with regard to safety and the additional adjustment functions can be added to the already existing construction of the back rest in the most possible simple manner.

This task is solved according to the invention by a back rest of a motor vehicle seat, which comprises a back rest support, onto which a shoulder rest for a separate adjustment of an upper section of the back rest is provided, whereby the shoulder rest is linked to the back rest support and that an adjustment device is allocated to it, which is embodied as an air bag, which can be filled and emptied in a controlled manner and which is arranged between the back rest support and the shoulder rest and that re-adjusting means are provided, which are arranged between the shoulder rest and the back rest support and which stress the shoulder rest in one of its two extreme positions, for example the position of the smallest distance from the back rest support.

According to the invention, the back rest support is embodied in the usual way as with a motor vehicle seat, which is not provided with the additional adjustment function. The shoulder rest is linked onto it. The shoulder rest can be moved and adjusted in a relative manner to the back rest support via an adjustment device. In a relative position between the shoulder rest and the back rest support, for example in the furthest position to the back, a configuration is given in the same manner as it is given with a back rest, which is not embodied with the additional adjustment function. Opposite this point of reference the upper area of the back rest can be additionally tilted slightly to the front under all circumstances, but possibly also towards the back, by tilting the shoulder rest opposite the back rest support.

An air bag, which can be filled and emptied in a controlled manner, is arranged between the back rest support and the shoulder rest for the adjustment device. It effects an adjustment in only one direction, for example in the sense of a swing-out of the shoulder rest out of the back rest support. The opposite direction is served by the piece of re-adjusting means. It can be embodied in a passive way, for example as a piece of elastic means, for example via springs. It may also be active, for example it may comprise a second air bag.

The air bags can either be vacuum cushions or pressure cushions. With a motor vehicle the vacuum cushions have the advantage, that a vacuum is usually available.

Preferably, the shoulder rest is embodied as a U-shape strap, which is linked to the back rest support on both sides. It can be strung with springs, which support the upholstery, for example springs, which extend between its arms. It can also embody a supporting surface for an upholstery body.

Hereby, in a preferred development of the invention, the back rest takes over the task of supporting the upholstery body above the swiveling point, while the upholstery body of the back rest is arranged at the back rest support below the swiveling point.

In an especially preferred development the head rest of the back rest is connected with the shoulder rest in a mechanical manner. An adjusting movement of the shoulder rest is transferred to the head rest in such a way that the latter always has the same distance with regard to the shoulder rest. Due to that, it is avoided that the head rest has to be re-adjusted separately, when adjusting the shoulder rest. Thereby the head rest preferably remains arranged mechanically to the back rest support all the same and it is only tilted in an angular adjustment towards the same in such a way that the head rest cushion always remains in the same distance to the upper edge of the shoulder rest.

As an alternative it may be more simple with regard to the construction, to appoint the head rest to the back rest support and to not make its position adjustable with the shoulder rest.

Further advantages and characteristics of the invention derive from the other claims as well as from the following description of a non-restrictive embodiment of the invention, which is illustrated further with regard to the drawing. This drawing shows in:

DESCRIPTION OF THE PREFERRED EMBODIMENTS

Figure 1:
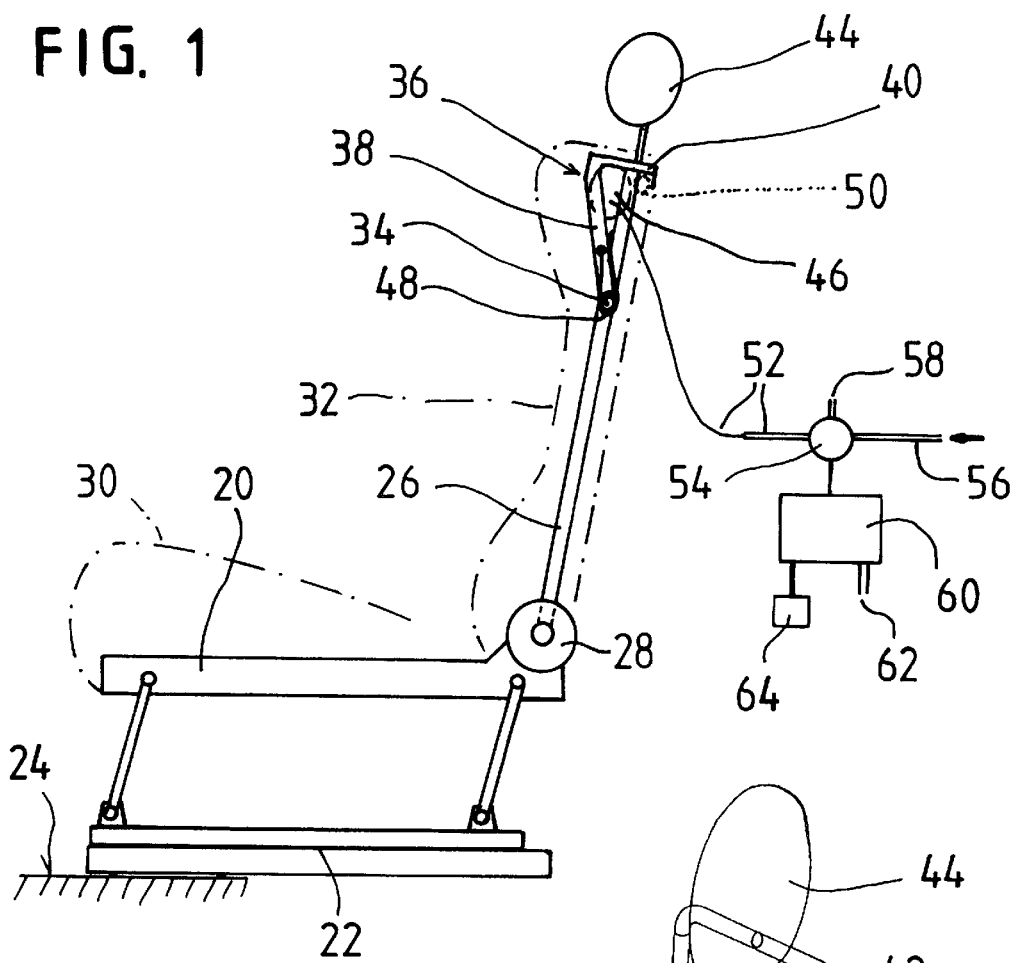
FIG. 1: A side view of a motor vehicle seat in a schematic illustration.
Figure 2:
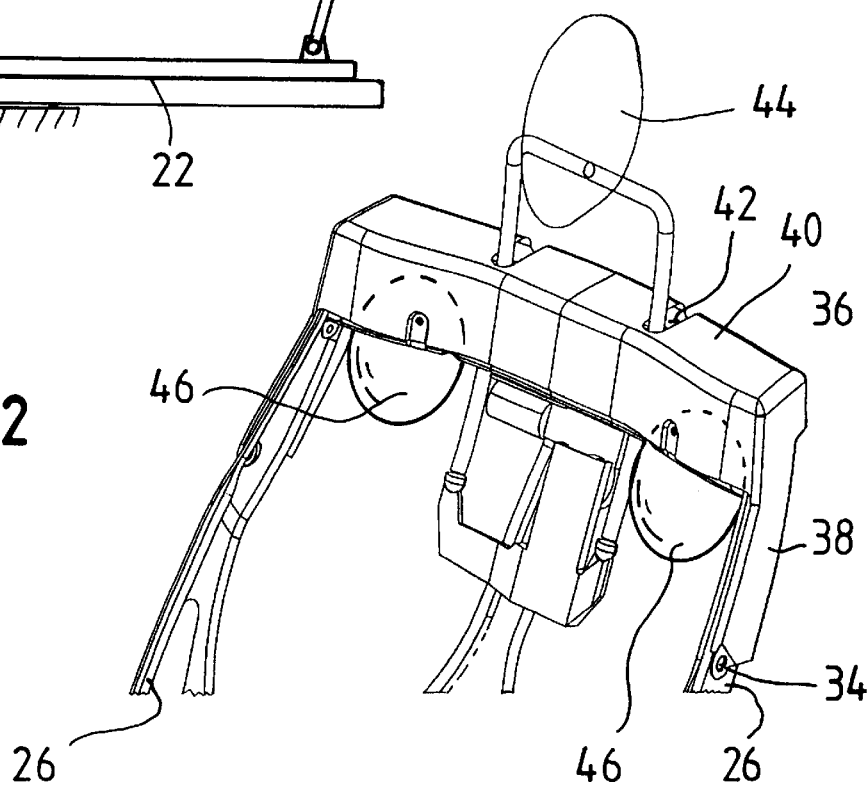
FIG. 2: a perspective illustration of a motor vehicle seat according to FIG. 1, only the upper section with a shoulder rest, without a back rest upholstery, is illustrated.

The motor vehicle seat according to the figures has a seat support 20, which is connected with a longitudinal adjustment device 22 via front and a back swinging arms. The latter is attached to the understructure of the body 24 of the motor vehicle. A back rest support 26 is linked to the seat support 20, the angular position with regard to the seat carrier 20 can be adjusted and locked via a joint mounting of the back rest 28.

The seat carrier 20 has an upholstery body 30 in the manner already known. An upholstery body of a back upholstery 32 is provided at the back rest support 26. At the back rest support 26 in the area above the center thereof, a shoulder rest 36 is linked in side swiveling points 34, which are positioned at the same height. It has two side arms 38, extending downwards, which are positioned outside the back rest support 26 and a basic area 40, which laps over the upper edge of the back rest support 26. In the basic area slits 42 are provided for the supporting spars of a head rest 44, which has two wing spars in the illustrated embodiment.

The basic area 40 limits a hollow space, which is open towards the bottom. This is chosen in such a size, that the shoulder rest with its basic area 40 laps over the back rest support 26 in its upper area and namely in all positions of the shoulder rest 36, which are admitted. Furthermore two air bags 46 are arranged in this hollow space. They are positioned in a parallel manner and are positioned between the shoulder rest 36 and the back rest support 26, they are embodied as vacuum cushions. The stronger they are blown up, the further the shoulder rest 36 is swiveled away from the back rest support 26, the basic area 40 is moved to the left then in the illustrations. The re-adjusting of the shoulder rest 36 in its position of the lowest distance from the back rest support 26 is effected by emptying the air bag 46 and a piece of elastic means, which is embodied here as a leg spring 48. A leg spring 48 of this kind is provided on both sides. It covers the axle pins of the swivelling points 34 respectively, is adjacent with a spring arm to the respective arm 38 of the shoulder rest 36 and supports itself with the other spring arm at the back rest support 26.

Instead of a piece of elastic means in the shape of two springs 48, as already described just now, a second air bag 50 can also be used for the re-adjusting process, in FIG. 1 a second air bag of this kind is hinted in a dotted line, it is arranged between the back rest support 26 and a back basic area 40, extending downwards. Other solutions are also possible.

The air bag 46 is connected to a device for a controlled filling and emptying via an air tube 52. The same is positioned within the motor vehicle seat, for example in the back rest or also in the underframe. In FIG: 1 it is illustrated outside the motor vehicle seat for a better recognition. The same is explained further in the following.

The device has a multipath valve 54, which is embodied here as an electromagnetic valve. To one entrance of this multipath valve 54 the air tube 52 is connected. Another entrance is supplied with compressed air by a source of compressed air, which is not illustrated here any more (see arrow), this compressed air is conducted via a tube 56. Finally 58 is a vent hole.

The valve 54 is electrically controlled by a control device 60, to which electrical voltage is guided to 62 from the control board, furthermore it has a switch 64, for example a rocker, via which the manual control is performed, namely emptying, keeping the pressures and the process of filling.

When blowing up the cushion, the vent hole 58 is closed and the air tube is in direct connection with the tube 56, through which it receives compressed air (see arrow). For emptying the air cushion 46, the valve outlet to the tube 56 is closed and the air tube 52 is connected with the vent hole 58. That way air can be let out of the air cushion 46 in a controlled manner. The vent hole 58 is preferably narrowed in such a way that the adjustment path is performed with the desired speed. The same applies to the supply of compressed air via the tube 56 into the air tube 52. For keeping up the pressure in the air cushion 46 the multipath valve is moved into a third position. In it the path to the air tube 52 is blocked.

If instead of a piece of elastic means a second air cushion 50 is used for the re-adjustment, then it can be connected to the vent hole 58. There may also be a second device provided for the filling and emptying of this second air cushion 50 in a controlled manner.

The upholstery body of the back rest upholstery 32 is connected with the shoulder rest 36 in its upper area. Expressed in different words, the shoulder rest 36 is positioned between this back rest upholstery 32 and the back rest support 26. Based on the relatively wide embodiment at the top of the basic area 40, the entire path, which the shoulder rest 36 can drive along, is positioned within the upper area of the back rest upholstery 32.

The shoulder rest 36 can be embodied of light weight, it may be for example a part made of plastic, which is moulded.

What is claimed is:

1. A backrest of a motor vehicle seat which comprises a backrest support onto which a shoulder rest for a separate adjustment of an upper section of the backrest is provided, said back rest support and shoulder rest having a position of smallest and largest distance from each other, whereby the shoulder rest comprises a U-shaped strap, which has two downwardly extending side arms and a basic area, said basic area laps over an upper edge of the backrest support, said side arms are linked to the backrest support at a left side swiveling point and at a right side swiveling point which are positioned at a height which is identical for both swivel points and an adjustment device which comprises at least one air bag which can be filled and emptied in a controlled manner and which is arranged between the backrest support and the shoulder rest to adjust said shoulder rest between said position of smallest distance from the backrest support and said position of largest distance from the backrest support and including re-adjusting means arranged between the shoulder rest and the backrest support which stress the shoulder rest in one of said positions.

2. The backrest according to claim 1 wherein the back rest support above said left side swiveling point and said right side swiveling point has about the same length as the shoulder rest in the direction to the upper edge of the backrest.

3. The back rest according to claim 1 wherein said back rest support has a total length and said left side swiveling point and said right side swiveling point are positioned in a central part of a third section of the total length of the back rest support.

4. The back rest according to claim 1 wherein said shoulder rest is positioned between the back rest support and an upholstery body of the back rest.

5. The back rest according to claim 1 wherein said re-adjusting means is at least one spring.

6. The back rest according to claim 1 wherein said re-adjusting means is a second air cushion.

7. The backrest according to claim 1 further including mountings between the shoulder rest and the backrest supports extreme positions the maximum and minimum angle of rotation of the shoulder said mountings are stops which limit and define the positions of smallest and largest distance.

8. The backrest according to claim 1 wherein a free upper end of the shoulder rest describes a path when the shoulder rest is swiveled from the position of the largest distance to the position of smallest distance, said path having a length of less than 10 centimeters.

9. The backrest according to claim 8 wherein said path is 8 centimeters.

10. The backrest according to claim 8 wherein said path is 5 centimeters.

11. A backrest of a motor vehicle seat, which comprises a backrest support onto which a U-shaped shoulder rest for a separate adjustment of an upper section of the backrest is provided, whereby the shoulder rest is linked to sides of the backrest support and said shoulder rest and back rest have positions which are largest distance and smallest distance from each other, and an air bag is arranged between the backrest support and the shoulder rest, said air bag having control means for filling and emptying said bag, and including re-adjusting means, which are arranged between the shoulder rest and the backrest support which stress the shoulder rest in one of the position of smallest distance from the backrest support and the position of largest distance from the backrest support.

* * * * *